2,843,566
Patented July 15, 1958

2,843,566
ALKENYLPHENOL-ALDEHYDE

Roger M. Christenson, Whitefish Bay, and Lowell O. Cummings and Alfred R. Bader, Milwaukee, Wis., assignors to Pittsburgh Plate Glass Company No Drawing. Application November 3, 1953
Serial No. 390,089

8 Claims. (Cl. 260—53)

This invention relates to the preparation of novel and useful phenol-aldehyde type resins, and pertains more particularly to the preparation of such resins by the alkaline condensation of an aldehyde with a mixture of alkenylphenols.

It is known that a phenol having an unsaturated open chain hydrocarbon substituent can be condensed with an aldehyde, and particularly formaldehyde, to form resins intended for use in coating compositions such as varnishes, lacquers and the like. A condensation reaction of this type is described in U. S. Patent 2,006,043. This patent, however, discloses that the resulting resins produce slow drying films and additionally are reddish or reddish-brown in color. As a result, these resins are generally unsatisfactory for use in coating compositions.

To overcome the objectionable color and drying characteristics possessed by such unsaturated phenol-aldehyde resins, certain substituted phenols, specifically monosubstituted phenols whose substituent is a monoolefinic hydrocarbon radical, said radical being in the para position and having from 3 to 4 carbon atoms, have been condensed with formaldehyde in the presence of a zinc salt of an organic acid whose strength is not substantially greater than that of formic acid. The use of para-substituted phenols was considered to be a critical expedient in this latter process, since it was heretofore believed that ortho-substituted phenols produce resins which are very dark and in general are unsatisfactory for use in coating compositions. This second method, while producing resins which are light-colored, is not particularly satisfactory for use on a commercial scale in that only certain specific para-substituted phenols can be utilized, and since it is quite difficult and costly to obtain relatively pure para-substituted phenols. Moreover, only certain specific acidic catalysts can be employed in this latter process.

It has now been discovered that excellent resins of the phenol-aldehyde type are obtained by condensing an aldehyde such as formaldehyde with a mixture of alkenylphenols in the presence of an alkaline catalyst. The resins thus obtained produce films which are fast drying and curing, and very light colored. Also the resins possess excellent alkali resistance and electrical properties, and are extremely compatible with varnishes and drying oils and other materials utilized in the preparation of coating compositions, such as epoxide resins, alkyd resins, vinyl resins and polyvinyl acetal resins. In general, the resins obtained by the method of this invention are superior in a number of properties to those obtained when a single unsaturated phenol is condensed with an aldehyde.

The mixture of alkenylphenols which is condensed with an aldehyde in accordance with the present invention may vary widely in composition. Ordinarily, the predominant component of the mixture is one or more monoalkenylphenols (including ortho- and para-monoalkenylphenols), the monoalkenyl component constituting about 55 to 85 percent by weight of the total mixture. The balance of the mixture (about 15 to 45 percent) is composed primarily of di- and trialkenylphenols, although other phenolic materials, including polyphenols such as alkane di- and triphenols may also be present, depending upon the method by which the alkenylphenol mixture is prepared.

Mixtures of alkenylphenols of the type described in the foregoing paragraph are readily obtained by the methods described in copending applications, Serial No. 300,359, filed July 22, 1952, and Serial Nos. 337,226, 337,227, 337,228 and 337,229, all filed February 16, 1953. The methods described in these copending applications involve the reaction of conjugated dienes with phenolic compounds in the presence of certain catalysts such as the Friedel-Crafts compounds. For example, the reaction product obtained by the reaction of butadiene-1,3 with phenol in the presence of an aqueous sulfuric acid catalyst is generally composed of less than about 15 percent unreacted phenol, less than about 5 percent of ethers, 55 to 70 percent of monobutenylphenols and 15 to 50 percent of the higher boiling phenols including di- and tributenylphenols and polyphenols. Ordinarily, the unreacted phenol and ethers will be removed from the reaction mixture by distillation before the condensation reaction with an aldehyde is carried out; however, this is not a critical expedient and the condensation reaction takes place readily even though the unreacted phenols and ethers are not removed. Mixtures containing smaller quantities of monoalkenylphenols and larger quantities of the higher boiling phenols, for example, about 50 percent monoalkenylphenols and 30 to 50 percent of higher boiling phenols and the balance polyphenols and ethers, may also be employed with good results, as may mixtures containing no monoalkenylphenols. Also, the mixture may be composed entirely of ortho- and para-monoalkenylphenols, and, in fact, excellent resins are obtained when such a mixture is employed. Mixtures of alkenylphenols with other phenols containing no unsaturated side chain, such as phenol, butylphenol, amylphenol and the like may also be used.

It is to be understood that mixtures of alkenylphenols can also be obtained by other methods known to the art in addition to the reaction of conjugated dienes with phenolic compounds, and it is intended that the present invention include the use of any mixture of alkenylphenols regardless of the method whereby it is obtained.

As illustrative of the alkenyl substituted phenolic compounds which in admixture are condensed with an aldehyde to form the novel resins of the present invention there are set forth below the products of the reaction of butadiene-1,3 and phenol:

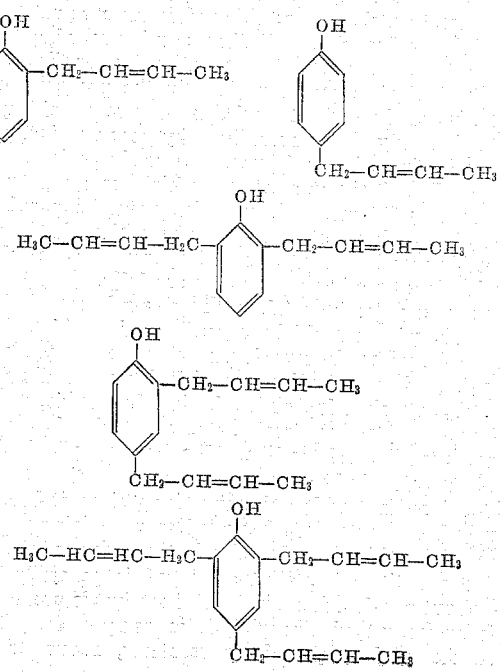

A mixture of the above alkenylphenols forms excellent resins when condensed with an aldehyde in the presence of an alkaline catalyst.

In general, the alkenylphenolic compounds in the mixtures condensed with aldehydes possess the structure

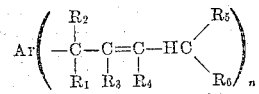

wherein Ar is an aromatic radical, $R_1$, $R_2$, $R_3$, $R_4$, $R_5$ and $R_6$ are hydrogen, halogen or an organic radical, such as a hydrocarbon radical, and which may be the same or different, and $n$ is a number, ordinarily from 1 to 3. The alkenyl compounds of the above structure are all readily obtained by the reaction of phenolic compounds with conjugated dienes in accordance with the methods described in the copending applications.

Phenolic compounds which may be reacted with conjugated dienes to give compounds of the above structures include phenol, catechol, resorcinol, pyrogallol, tertiary butyl catechol, beta-naphthol, guaiacol, o-, m- and p-cresols, 2,3-xylenol, 2,5-xylenol, 3,4-xylenol, m-alkylphenols, bis(4-hydroxyphenyl) 2,2-propane, and the like.

Typical conjugated dienes which react with phenolic compounds to form the desired mixture of alkenylphenols include butadiene-1,3, 2-methylbutadiene-1,3, piperylene, 2-methyl-pentadiene-1,3, hexadiene-1,3, 1-chloro-2-methylbutadiene-1,3, cyclopentadiene, and the like.

The preferred alkenylphenolic compounds for condensation with aldehydes in accordance with the present invention are mixtures of the butenylphenols, including ortho- and para-2-butenylphenols, di-2-butenylphenol and tri-2-butenylphenol. However, mixtures of other alkenylphenolic compounds may also be used, including butenylcresols, butenylcatechols, butenyl-2,3-dimethoxyphenols, mono-, di- and tributenylresorcinol, mono-, di- and tributenylguaiacol, 2-chlorobutenylcresol, 2-chlorobutenylphenol, 2-iodobutenylphenol, ortho- and para-cyclopentenylphenol, pentenylphenol, pentenylcresol, pentenylguaiacol, halopentenylphenols, halopentenylguaiacols, and the like.

It may be that the trialkenylphenols such as the tributenylphenols do not actually condense with aldehydes as do the mono- and dialkenylphenols, but instead react through the unsaturated linkages and the OH group. This type of reaction is of course not possible with conventional phenols and may account for the improved alkali resistance, electrical properties and faster cure rates possessed by resins prepared from a mixture of alkenylphenols as compared with conventional phenolic resins.

Any aldehyde may be utilized in the preparation of the resins of the present invention. However, aldehydes containing only atoms of carbon, hydrogen and oxygen, and particularly formaldehyde, are greatly preferred. In place of formaldehyde, a material which decomposes upon heating to yield formaldehyde, for example, paraformaldehyde or trioxymethylene, may be utilized in the condensation reaction. An aqueous 37 percent formaldehyde solution is generally used very successfully.

In carrying out the condensation of a mixture of alkenylphenols with an aldehyde such as formaldehyde in accordance with this invention, an alkaline catalyst is employed. Suitable alkaline materials include sodium hydroxide, potassium hydroxide, barium hydroxide, sodium carbonate, potassium carbonate, ammonia, hexamethylenetetraamine and the like. The fact that alkaline materials so effectively catalyze the condensation to give light colored resins is quite surprising since it has previously been contended that alkaline materials were the cause of the objectionable color in the resinous products.

The quantity of catalyst employed is generally such that about one-fourth equivalent of catalyst is present for each equivalent of alkenylphenolic compounds. Based upon the total weight of the reactants, about 0.5 percent to about 5.0 percent of alkaline material is utilized. Larger amounts of the catalyst may be employed if desired.

Alternatively, the catalyst may be dispensed with entirely, although higher reaction temperatures may then be required with attendant increase in darkening of the resinous product.

The molar ratio of aldehyde to alkenylphenols utilized in carrying out the condensation reaction of the present invention may be varied widely. Best results are obtained when about 2.0 moles of the aldehyde are utilized for each mole of the alkenylphenolic compounds in the reaction mixture. However, the ratio may be as low or lower than 0.5 to 1.0 or as high or higher than 5.0 to 1.0. When the ratio is much below the preferred 1.5 to 2.0 ratio the resinous product tends to be hard and more difficultly processable. When the ratio is substantially above 1.5 to 1.0 good results are obtained but there is no economical advantage in utilizing such large excess of the aldehyde.

The condensation reaction is best carried out by first admixing the alkenylphenols and the catalyst under an inert atmosphere such as nitrogen, and/or in the presence of sodium hydrosulfite, utilizing sufficient cooling to maintain the resulting reaction mixture at about room temperature (25° C.). When solution is obtained the aldehyde is added at a moderate rate and cooling is applied as needed to keep the temperature below about 35° C. Care should be taken to keep traces of air out of the reactor at all times during the condensation. Stirring is continued for about 48 hours at room temperature.

At the end of this time the reaction mixture is carefully acidified to a pH of about 5.0 with a mineral acid such as hydrochloric acid or sulfuric acid, or a carboxylic acid such as acetic acid or propionic acid. Two layers are formed, a water layer and an alkenylphenolic resin layer. The water layer is drawn off and the water-insoluble layer of resin is water-washed four or five times. At this point it is advantageous to add about 0.1 percent by weight of a material such as an amino tetracarboxylic acid which forms a complex with any iron in the reaction mixture. The presence of uncomplexed iron is likely to cause darkening of the product. The resin is then dehydrated by vacuum stripping at steam temperatures and at a pressure of about 20 mm. to 55 mm. Alternatively, the water can be removed by adding butanol and then carrying out an azeotropic distillation.

While the above-described method for carrying out the condensation is preferred, particularly when the alkenylphenol mixture is a mixture of butenylphenols, other methods of carrying out the condensation, for example, simply by admixing the reactants and catalyst and allowing the mixture to stand at room temperature for about 48 hours, or by maintaining the reaction mixture at temperatures as high as 100° C. or higher, may also be utilized. In the event that higher temperatures are utilized the condensation will, of course, require less time than when the condensation is carried out at room temperature.

While the resins of this invention are generally recovered as viscous liquids, it is also possible to obtain hard resinous materials by condensing equimolar quantities of alkenylphenols and aldehyde in the presence of an alkaline catalyst and then acidifying the reaction mixture to a pH of about 2.0. The resulting hard materials are useful as varnish resins. They can also be ground with paraformaldehyde to give compositions which are useful as molding powders.

The following examples illustrate more fully the preparation of alkenylphenol mixtures and the preparation of resins by the condensation of a mixture of alkenylphenols with an aldehyde. The examples are not, however, intended to limit the scope of the invention, for there are, of course, numerous possible variations and modifications. In the examples all parts are by weight.

Example I

Fifty-four grams (1 mole) of butadiene-1,3 in 100 cc. of toluene were added to a mixture of 94 grams (1 mole) of phenol, 100 cc. of toluene, 23 grams of polyphosphoric acid, and 10 grams of 85 percent syrupy phosphoric acid, whereupon an exothermic reaction took place. The reaction mixture was then cooled to room temperature and stirred for about 14 hours, after which the product was washed and the mixture fractionally distilled. Sixty grams of mixed monobutenylphenols, and minor quantities of di- and tributenylphenols were obtained.

Example II

Twenty-eight grams of titanium tetrachloride were added to a mixture of 94 grams (1 mole) of phenol, 65 grams (1.2 moles) of butadiene-1,3 and 200 cc. of toluene cooled to a temperature of −10° C. An exothermic reaction resulted and the reaction mixture was maintained at room temperature for 16 hours. The reaction mixture was then washed to remove the catalyst and distilled at reduced pressures. A yield of monobutenylphenols of about 85 percent, together with minor quantities of di- and tributenylphenols, was obtained.

Example III

Seventeen pounds of toluene, 17 pounds of phenol and 28.8 pounds of 67.2 percent sulfuric acid were charged into a glass-lined reactor and the reactor was then sealed. Ten and three-tenths pounds of butadiene-1,3 were added to the reactor over a period of about 15 minutes, the temperature being maintained at about 55° F. The reaction mixture was then agitated for about 18 hours after which agitation was stopped to allow the acid layer to settle out. The acid was drawn off and the remainder of the reaction mixture treated with sodium carbonate to neutralize any remaining traces of acid. The reaction mixture was then distilled to remove the toluene. A 59.0 percent yield of monobutenylphenols was obtained. The remainder of the reaction mixture contained dibutenylphenols (8.0 percent), higher boiling phenols (29.0 percent) and unreacted phenol and ethers (4.0 percent).

Example IV

One hundred forty-eight parts of a mixture of monobutenylphenols (o- and p-monobutenylphenols) and 10 parts of sodium hydroxide in 100 parts of water were mixed under a nitrogen atmosphere with sufficient cooling to keep the temperature below 35° C. When a homogeneous solution was obtained, 162 parts of 37 percent formalin, methanol free, containing 60 grams (2 moles) of solid formaldehyde were added at a moderate rate and cooling was applied to keep the temperature below about 35° C. Stirring was continued for about 48 hours at room temperature. At the end of this time the reaction mixture was acidified to a pH of 5.0 with a mixture of concentrated hydrochloric acid and water (50 percent acid and 50 percent water) and the resulting water insoluble layer of the resin was washed four times with lukewarm water. The resin was then dehydrated by vacuum stripping at steam temperatures under 20 to 50 mm. pressure. The yield based on the quantity of alkenylphenols utilized was 120 percent, the color was 10 to 14 (Gardner), the viscosity at 25° C. was W to Z (Gardner-Holdt), and the resulting resin was completely miscible with ethanol, butanol, toluene, and xylene. The resin thus prepared gave a hard film on baking for only 30 minutes at about 150° C.

Example V

Example IV is repeated using each of the following formaldehyde:butenylphenol ratios: 0.8:1, 1:1, 2:1, and 4:1. In each run a resin is obtained which gives light colored, fast curing films and which is compatible with drying oils and a great many other film forming materials.

Example VI

Several aldehydes were condensed with mixed butenylphenols prepared according to Example III, acetic acid being utilized to acidify the reaction mixture in each run. The aldehyde utilized, the catalyst concentration, the mole ratio of aldehyde to butenylphenol, the reaction time and temperature (degrees centigrade) are set forth in the following table:

| Aldehyde | Catalyst | Mole Ratio Of Aldehyde To Mixed Butenylphenols | Reaction Time and Temperature (Degrees C.) |
| --- | --- | --- | --- |
| Furfural | 3% Sodium Hydroxide | 1:1 | 25° C.—48 hrs. |
| Crotonaldehyde | 4% Sodium Hydroxide | 4:1 | 25° C.—90 hrs. |
| Acetaldehyde | do | 4:1 | Do. |

The resins obtained utilizing each of the above aldehydes formed hard alkali resistant films when applied to a metal surface and baked.

Example VII

One hundred sixty parts of a mixture of cyclopentenylphenols, 130 parts of 37 percent formalin solution and 1 part of sodium hydroxide in 5 parts of water were admixed and stirred at steam temperature (92° C. to 96° C.) for 1.5 hours, then acidified with acetic acid, water washed five times and dehydrated several hours at steam temperatures under 20 mm. to 50 mm. pressure. The resinous material obtained was coated on a metal surface and baked at 150° C. for 30 minutes to give a hard, acetone insoluble film.

Example VIII

Twenty parts by weight of a mixture consisting of 12.3 percent unreacted phenol and ethers (B. P. 70° C.–100° C. at 10 mm.), 66.3 percent monobutenylphenols (B. P. 110° C.–140° C. at 10 mm.), and 20.4 percent of di- and tributenylphenols (the mixture being obtained by the method of Example III), 20 parts by weight of 37 percent aqueous formaldehyde, and 0.4 part by weight of hexamethylenetetramine were heated under reflux on a steam bath for about 16 hours. The water and unreacted formaldehyde were then removed by distillation, leaving a resin soluble in ethyl alcohol, ethyl acetate, benzene, toluene, and aromatic naphthas, but insoluble in aliphatic hydrocarbons.

Example IX

Fifteen hundred and fifteen grams of a mixture of di- and tributenylphenols, 300 grams of sodium hydroxide and 1500 grams of water were admixed to form a solution. To the resulting solution 1215 grams of formalin were added, the temperature of the mixture being maintained at 25° C. Nitrogen gas was maintained over the surface of the reaction mixture for 120 hours after which the reaction mixture was acidified to a pH of 3.4, a lower water layer and a resinous top layer forming during the acidification. The water layer was then withdrawn and the resinous layer washed five times with water and distilled until a viscosity of W (Gardner) was obtained. The resulting resin formed acetone insoluble, alkali resistant, flexible films when coated onto metal and glass surfaces. The films cured to the acetone insoluble stage in only ten minutes at about 175° C.

Example X

Thirteen hundred fifteen and one-half grams of a mixture of mono-, di-, and tributenylphenols, 1440 grams of formalin solution and 144 grams of aqueous ammonium hydroxide were admixed with stirring, the temperature of the mixture rising to 97° C. during the addition period. The reaction mixture was then held at about 100° C. for 6 hours, after which the hot water layer was decanted and the remainder of the reaction mixture was distilled to strip off excess water, formaldehyde and ammonium hydroxide. A resin having a solids content of 94.2 percent, and useful in the formation of films was obtained.

*Example XI*

Two hundred and sixty-one grams of a mixture of m-alkylalkenylphenols (obtained by the alkenylation of a mixture of phenols which are produced by the hydrogenation of coal), 162 grams of formalin and a solution of 10 grams of sodium hydroxide in 300 grams of water were admixed to form a solution. The resulting solution was maintained at about 30° C. for approximately 24 hours, the surface of the reaction mixture being blanketed with nitrogen gas during the 24 hour period. Additional formalin in the amount of 34 grams was added and the reaction mixture allowed to stand for 24 hours. The reaction mixture was then acidified with hydrochloric acid to a pH of 4.0, and the water layer which formed was decanted. The resinous top layer was washed with water and dried. A resin having a Gardner viscosity of $Z_6$ and a solids content of 91.2 percent was obtained. Films from this resin possessed properties in general equivalent to those obtained utilizing resins prepared from a mixture of butenylphenols as in the preceding examples.

*Example XII*

The following materials were charged into a glass lined reactor:

24.6 pounds mixed butenylphenols (monobutenylphenols, di- and tributenylphenols)
27.0 pounds formalin solution (37 percent formaldehyde)
1.7 pounds sodium hydroxide
1.7 pounds water
0.12 pound sodium hydrosulfite The resulting mixture was cooled to 75° to 80° F. and the reaction mixture agitated for 5 hours after which it was allowed to stand for 43 hours. The reaction mixture was then acidified to a pH of 5.0 with 68 percent sulfuric acid, and allowed to stand until a water layer settled out. The water layer was then drawn off and discarded. The wet resin (36.25 pounds) was treated with 0.04 pound of an amino tetracarboxylic acid known commercially as Sequestrene AA. The resin was then heated to 220° F. and stripped with an inert gas (nitrogen) until a Gardner viscosity of W at 75 percent solids in normal butanol was reached. The resin was then thinned with 10 pounds of n-butanol and filtered at 110° F. The following is the analysis of the final material.

Weight per gallon_____ 8.45 pounds.
Solids_____ 66.2 percent at 110° C.
Viscosity_____ Q to R (Gardner).

The resin thus prepared was roller coated on tinplate and cured at 350° F. for 20 minutes. The resulting film was of a thickness such that the film weighed 16 mgs./4 sq. in., and was light colored, mar-resistant and insoluble in acetone.

*Example XIII*

Sixteen hundred twenty grams of a mixture of pentenylphenols, 1620 grams of formalin solution (37 percent formaldehyde), 100 grams of sodium hydroxide in 100 grams of water, and 8 grams of sodium hydrosulfite were charged into a glass reactor and the resulting mixture stirred for 48 hours at a temperature of 25° C. to 30° C. The reaction mixture was acidified with 70 percent sulfuric acid until a pH of 5 was reached. The water layer which had formed was drained off and 2 grams of Sequestrene AA were added to the resin layer. The resin layer was then dried by blowing with an inert gas for 3 hours at 100° C. to give a resin having a viscosity of $Z_6$. This resin was thinned with 622 grams of butanol to give a final product having 63.7 percent solids and a viscosity of V. The resulting resin baked to a hard, acetone resistant film in generally the same manner as resins prepared from a mixture of butenylphenols.

As disclosed hereinabove resins prepared according to the foregoing examples possess many valuable properties not possessed by other phenolic resins; for example, films prepared with resins obtained by the condensation of a mixture of alkenylphenols with an aldehyde are tough, transparent and glossy after only 30 minutes' heating at about 150° C. Films prepared from other phenolic resins, including those prepared according to the method of U. S. Patent 2,006,043 require heating at several hours at temperatures of 125° C. to 150° C. to secure a hard film, which even then is very dark in color.

Moreover, when the resins of this invention are plasticized with small quantities of a polyvinyl acetal resin, preferably polyvinylbutyral, the resins cure in only 10 minutes at 175° C. and at even lower temperatures when catalyzed with a material such as phosphoric acid, toluenesulfonic acid or the like. Other available phenolic resins require a minimum of 20 minutes at 200° C. The plasticized resin also possesses extremely good alkali resistance, withstanding 200 hours' immersion in 3 percent alkali without loss of adhesion, blistering or hydrolysis. A similar film prepared from the resinous product obtained by the condensation of formaldehyde with the trimethylol allyl ether of phenol (a commercially available phenolic), with the acetal resin plasticizer almost immediately discolors to a dark brown and blisters badly in 24 hours when immersed in 3 percent alkali.

Other advantages possessed by the resins of this invention include excellent solvent resistance, extremely light color in thin films with no discoloration on overbaking, good flexibility, impact resistance and adhesion, excellent hardness and non-marring surface, good solubility, good compatibility, and high solids content at medium viscosity. One particular advantage is that they do not impart taste to foods. These valuable properties are particularly desirable in applications such as sanitary liners for food containers, drum liners, and electrical insulating varnishes, as well as in other specific fields where thin film protection is desired.

Gelling of the phenolic resins prepared according to this invention can be greatly accelerated by the addition of catalysts such as p-toluene sulfonic acid, phosphoric acid, oxalic acid, zinc chloride, sulfanilic acid, ethylene diamine, benzoyl peroxide and the like. For example, p-toluene sulfonic acid causes the phenolic resins to gel in as little as 3 minutes.

The alkenylphenol-aldehyde resins of the present invention are reactive due to the presence of the additional unsaturated linkage in the side chain or chains and are in themselves capable of condensing with a variety of other materials to provide products having improved properties. For example, drying oils add a substantial degree of flexibility to the baked resin films. The resins have also been blended or compounded with such other materials as linseed alcohols, octadecanol, aniline, styrenated maleinized alkyds having excess hydroxyl groups, epoxy resins, and with synthetic rubbery materials such as liquid polybutadiene. In each instance excellent film forming properties were obtained.

Varnishes prepared utilizing the resins described herein form films which are light colored, fast drying and extremely resistant to the action of alkalis. It has also been found that these resins cook into varnish oils at a much faster rate than do other phenol-aldehyde resins. The resins themselves may be bodied by blowing an inert gas through the heated material.

From the foregoing description of the invention it will be seen that the alkenylphenol aldehyde resins of the present invention constitute a new and useful class of resinous materials. It is apparent, therefore, that various embodiments of the invention, in addition to those specifically disclosed, may be provided without departing from the

We claim:

1. A light colored resinous material comprising the product of the alkaline condensation of an aldehyde containing only atoms of carbon, hydrogen, and oxygen, with a mixture of butenylphenols containing about 55 percent to 85 percent by weight of ortho- and para-monobutenylphenols, and about 15 percent to 45 percent by weight of di- and tri-butenylphenols.

2. The light colored resinous material of claim 1 wherein the aldehyde is formaldehyde.

3. A light colored resinous material comprising the product of the alkaline condensation of an aldehyde containing only atoms of carbon, hydrogen, and oxygen, with a mixture of butenylphenols containing about 55 percent to 85 percent by weight of ortho- and para-monobutenylphenols, and about 15 percent to 45 percent by weight of di- and tri-butenylphenols, the ratio of aldehyde to butenylphenols utilized in said alkaline condensation reaction being from about 0.5 mole to 5.0 moles of aldehyde per mole of the butenylphenols.

4. The light colored resinous material of claim 3 wherein the aldehyde is formaldehyde.

5. The method which comprises condensing an aldehyde containing only atoms of carbon, hydrogen, and oxygen, with a mixture of butenylphenols containing about 55 percent to 85 percent by weight of ortho- and para-monobutenylphenols, and about 15 percent to 45 percent by weight of di- and tri-butenylphenols, in the presence of an alkaline catalyst, thereby to obtain a resinous material characterized by its ability to form fast drying, light colored coatings.

6. The method of claim 5 wherein the aldehyde utilized is formaldehyde.

7. The method which comprises condensing an aldehyde containing only atoms of carbon, hydrogen, and oxygen, with a mixture of butenylphenols containing about 55 percent to 85 percent by weight of ortho- and para-monobutenylphenols, and about 15 percent to 45 percent by weight of di- and tri-butenylphenols, in an amount such that there is present about 0.5 mole to 5.0 moles of aldehyde per mole of the butenylphenols, and in the presence of an alkaline catalyst, thereby to obtain a resinous material characterized by its ability to form fast drying, light colored coatings.

8. The method of claim 4 wherein the aldehyde utilized is formaldehyde.

References Cited in the file of this patent

UNITED STATES PATENTS

| | | |
|---|---|---|
| 2,006,043 | Dykstra | June 25, 1935 |
| 2,175,393 | Hentrich et al. | Oct. 10, 1939 |
| 2,242,250 | Honel et al. | May 20, 1941 |
| 2,587,578 | Jones | Mar. 4, 1952 |
| 2,631,140 | Bloch | Mar. 10, 1953 |
| 2,657,185 | Young | Oct. 27, 1953 |

FOREIGN PATENTS

| | | |
|---|---|---|
| 155,968 | Austria | Apr. 25, 1939 |

UNITED STATES PATENT OFFICE

CERTIFICATE OF CORRECTION

Patent No. 2,843,566                                          July 15, 1958

Roger M. Christenson et al.

It is hereby certified that error appears in the above numbered patent requiring correction and that the said Letters Patent should read as corrected below.

In the heading to the printed specification, line 2, the title of invention should read as follows instead of as in the patent —

ALKENYLPHENOL-ALDEHYDE RESINS column 2, line 5, after "1953" insert -- the latter two of which are now abandoned --; column 10, line 17, for the claim reference numeral "4" read -- 7 --.

Signed and sealed this 28th day of October 1958.

(SEAL)
Attest:

KARL H. AXLINE                                         ROBERT C. WATSON
Attesting Officer                                    Commissioner of Patents